United States Patent
Chao et al.

(10) Patent No.: US 7,728,936 B2
(45) Date of Patent: Jun. 1, 2010

(54) METHOD OF ALIGNMENTS OF LIQUID CRYSTAL EMPLOYING MAGNETIC THIN FILMS

(75) Inventors: Ru-Pin Chao, Hsinchu (TW); Hsin-Ying Wu, Yilan (TW)

(73) Assignee: National Chiao Tung University, Hsinchu (TW)

( * ) Notice: Subject to any disclaimer, the term of this patent is extended or adjusted under 35 U.S.C. 154(b) by 168 days.

(21) Appl. No.: 12/076,809

(22) Filed: Mar. 24, 2008

(65) Prior Publication Data

US 2009/0079929 A1    Mar. 26, 2009

Related U.S. Application Data

(63) Continuation of application No. 12/000,561, filed on Dec. 13, 2007.

(30) Foreign Application Priority Data

Sep. 20, 2007   (CN)   .......................... 2009 1 135213

(51) Int. Cl.
    *G02F 1/1337*   (2006.01)

(52) U.S. Cl. ...................................... 349/126; 349/123
(58) Field of Classification Search ................ 349/123, 349/126
    See application file for complete search history.

(56) References Cited

U.S. PATENT DOCUMENTS 7,184,116 B2 *   2/2007   Kamiya et al. .............. 349/123

* cited by examiner

*Primary Examiner*—Jerry T Rahll
(74) *Attorney, Agent, or Firm*—Jackson IPG PLLC (57) ABSTRACT

Alignments of liquid crystal are obtained. A transparent magnetic thin film provides a homeotropic alignment of liquid crystal molecules. Or, a homeotropic or homogeneous alignment having an adjustable pretilt angle is further obtained through rubbing the transparent magnetic thin film. The present invention has a simple procedure with a low cost. The present invention is used in equipment with a plasma source while providing high transmittance, hardness and insulation. And the transparent magnetic thin film has potential uses in the applications of non-contact multi-domain alignment without extra procedure for alignment treatment.

18 Claims, 7 Drawing Sheets

METHOD OF ALIGNMENTS OF LIQUID CRYSTAL EMPLOYING MAGNETIC THIN FILMS

This application is a Continuation of currently pending application U.S. Ser. No. 12/000,561, entitled "METHOD OF ALIGNMENTS OF LIQUID CRYSTAL EMPLOYING MAGNETIC THIN FILMS" and filed on Dec. 13, 2007.

FIELD OF THE INVENTION

The present invention relates to alignments of liquid crystal; more particularly, relates to obtaining an alignment effect of a non-contact multi-domain alignment for a liquid crystal layer by using a transparent magnetic thin film obtained through a direct-current (DC) ion-beam sputter.

DESCRIPTION OF THE RELATED ARTS

Early in 1911, C. Mauguin revealed an alignment of liquid crystal (LC) molecules through mechanical rubbing. This invention has been widely applied in LC displays (LCDs). Through rubbing a surface of alignment film of polyimide (PI), polyvinyl alcohol (PVA) or polyamide, a LC alignment is obtained. The PI film is the best material for being used as the alignment layer due to its chemical and thermal stabilities. The related alignment mechanism and properties have been widely studied. Because of the high productivity and low cost, the mechanical rubbing is the popular way for surface alignment in, the LCD industries. However, it still has some disadvantages as described in the following:

(1) During the mechanical rubbing, a contamination of dust on the surface is possible.

(2) During the mechanical rubbing, cracks generation may damage the structures of devices.

(3) A residual static charge may be obtained on the PI surface and thus damage the electric circuit underneath.

(4) It is hard to control the stability and uniformity of the pretilt angle of LC molecules on the rubbed PI film surface.

(5) Multi-domain alignment is one of the methods to solve the viewing angle problems of the LCDs. However, it is difficult to obtain the multi-domain alignment by using the mechanical rubbing on the surfaces with dimension in sub-millimeter scale.

In addition, because of the increasing demands for higher qualities and better performances of LCDs, several new liquid crystal alignment techniques are under developed. These new alignment techniques are usually carried out in non-contact way, which differs from the traditional rubbing, and are also called a non-contact alignment technique, such as collimated oblique ion beam bombardment, polarized UV irradiation of polymer molecules, Langmuir-Boldgett thin film and liquid crystal polymer film, oblique angle deposition of $SiO_x$, inclined bombardment with collimated plasma beams, alignment with micro-grooves, magnetic field alignment of liquid crystals, etc. However, a pre-coated alignment layer with high temperature thermal treatment is needed before the alignment treatment. Thus, the procedure is complex with a high cost. In addition, the degradation of the alignment films caused by UV irradiation, temperature, humidity, and etc. is also a drawback. Hence, most of the methods mentioned above are still not applicable in the LCDs industries. In other words, the prior arts do not fulfill all users' requests on actual use.

SUMMARY OF THE INVENTION

The main purpose of the present invention is to obtain a magnetic thin film through sputtering on a substrate of a liquid-crystal (LC) cell by a DC ion-beam sputter and to obtain a liquid crystal alignment through a film formation of the transparent magnetic thin film.

A second purpose of the present invention is to provide a home b tropic alignment of liquid crystal molecules by the transparent magnetic thin, film and to provide a homeotropic or homogeneous alignment having a pretilt angle by rubbing the transparent magnetic thin film, where magnetic properties are changed by controlling conditions for depositing the transparent magnetic thin film; and a magnitude of pretilt angle and an alignment mode are changed by controlling rubbing conditions.

The third purpose of the present invention is to obtain wide applications with a simple procedure and to provide high transmittance, hardness and insulation by an equipment with a DC or alternating-current (AC) type plasma source, where the transparent magnetic thin film is magnetic and a non-contact multi-domain alignment is obtained with no extra procedure required for alignment treatment.

To achieve the above purpose, the present invention is a method of alignments of liquid crystal employing magnetic thin films, comprising steps of: (a) obtaining a substrate of indium-tin oxide coated with a transparent conductive thin film; (b) sputtering on the substrate by a DC ion-beam sputter to obtain a transparent magnetic thin film; and (c) assembling an LC cell with the substrate to obtain a liquid crystal alignment by the transparent magnetic thin film in the LC cell, or, to further obtain a homeotropic or homogeneous alignment having a pretilt angle through rubbing. Accordingly, a novel method of alignments of liquid crystal employing magnetic thin films is obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Figure 1:
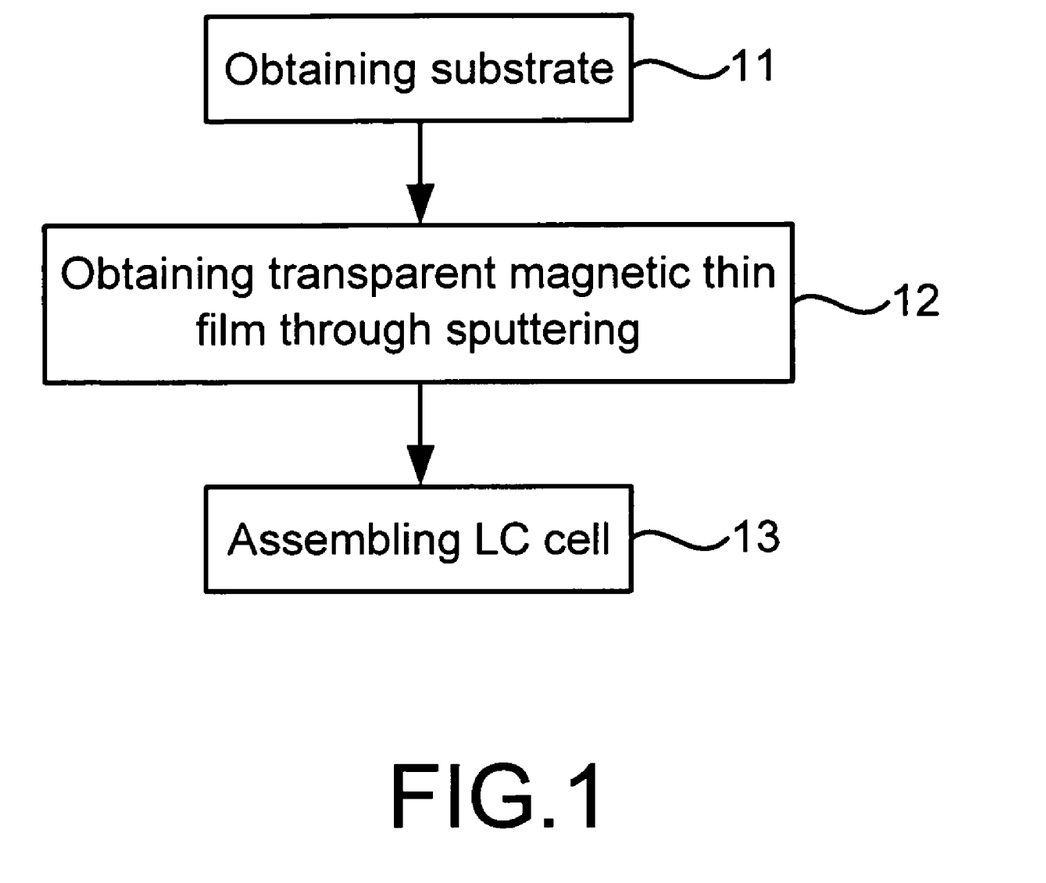
FIG. 1 is the flowchart showing the preferred embodiment according to the present invention.
Figure 2:
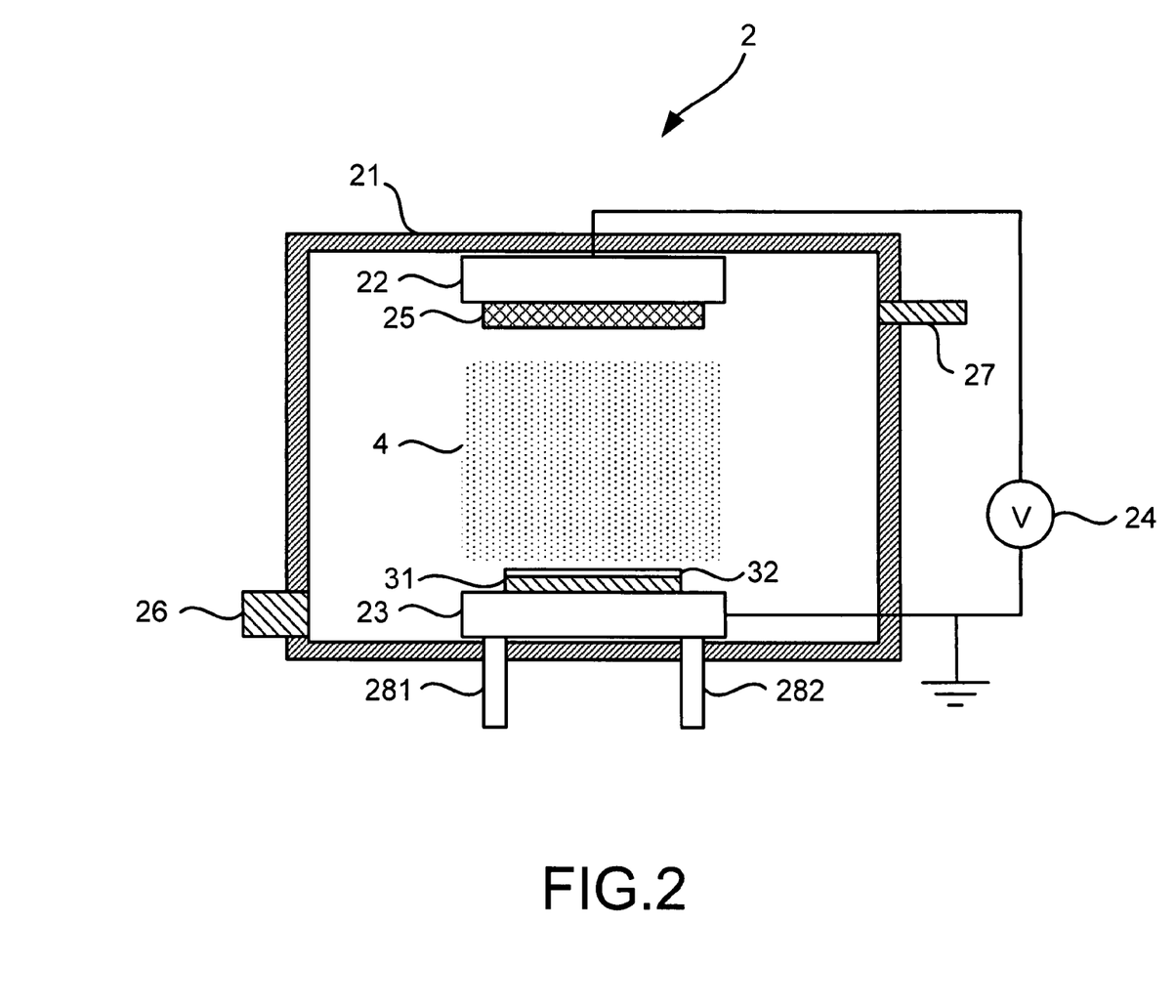
FIG. 2 is the structural view showing the DC ion-beam sputter.
Figure 3:
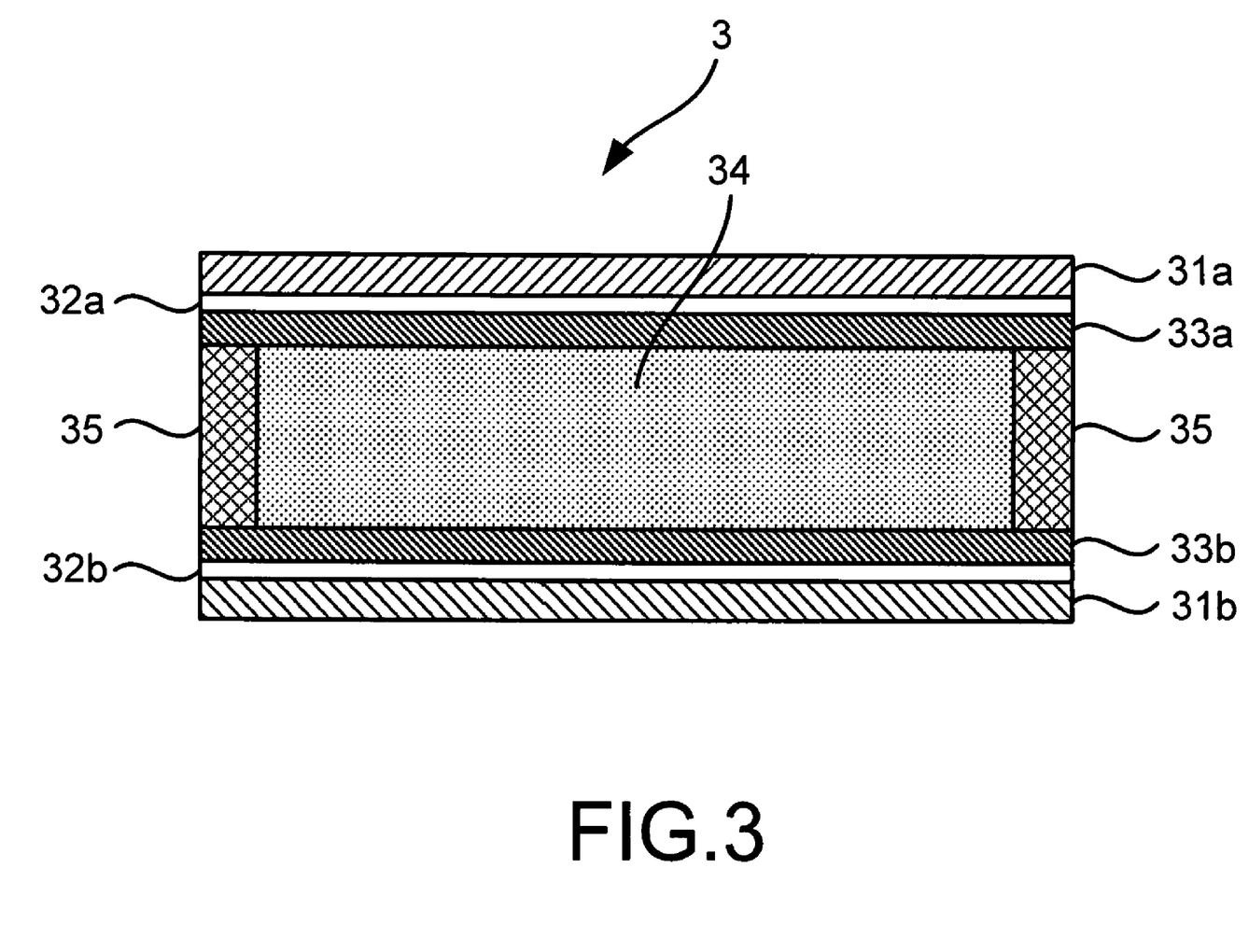
FIG. 3 is the structural view showing the LC cell.

Please refer to FIG. 1 to FIG. 3, which are a flowchart showing the preferred embodiment according to the present invention; and structural views showing a direct-current (DC) ion-beam sputter and a liquid crystal (LC) cell. As shown in the figures, the present invention is a method of alignments of liquid crystal employing magnetic thin films, comprising the following steps:

(a) Obtaining substrate 11: A substrate 31 coated with a transparent conductive thin film (Indium-tin oxide, ITO) 32 is obtained, where the substrate 31 is a glass or an optical device.

(b) Obtaining transparent magnetic thin film through sputtering 12: The substrate 31 is then sputtered in and by a DC ion-beam sputter 2, where the DC ion-beam sputter 2 comprises a vacuum chamber 21; a cathode 22; a grounded anode 23; a DC power supply 24; a cathode target 25, which is mounted, on the cathode 22 and is made of a stainless steel material; an exhaust pipe line 26; a gas inflow pipe line 27; and an anode circulating cooling system 28. The substrate 31 is laid flat on a surface of the anode 23, and a working gas is filled into the vacuum chamber 21 through the gas inflow pipe line 27. A DC potential drop is applied between the cathode 22 and the anode 23 through the DC power supply 24. A temperature is controlled below 250 Celsius degrees for the sputtering and an adjustable high energy ion beam is used to bombarding a surface of the cathode target 25. After sputtering for 5 to 10 minutes (min), a film formation is obtained by reacting iron ions with oxygen on a surface of the anode 23. During the sputtering, cooling water enters into the anode 23 through a cooling water inflow pipe line 281 of the anode circulating cooling system 28 to absorb the heat generated at the anode 23 by the bombardment. Then the heat is carried out of the DC ion-beam sputter 2 through a cooling water outflow pipe line 282 of the anode circulating cooling system 28. Thus, a transparent magnetic thin film is coated on the transparent conductive thin film of the substrate. Therein, the DC ion-beam sputter 2 can be replaced by an alternating-current (AC) ion beam sputter for generating, a DC plasma source 4 or an AC plasma source; the working gas is a mixed gas, comprising argon, nitrogen and oxygen; an ion beam energy in the DC ion-beam sputter 2 is higher than 700 volts (V); and, an ion beam current density in the DC ion-beam sputter 2 is higher than 255 micro-amperes per square centimeter ($\mu A/cm^2$).

(c) Assembling LC cell 13: Two substrates 31 after sputtering are obtained, comprising a first substrate 31a having a first transparent conductive thin film 32a; and a second substrate 31b having a second transparent conductive thin film 32b. A liquid crystal layer 34 is sandwiched between the first substrate 31a and the second substrate 31b, where the transparent magnetic thin film is sandwiched between the first substrate 31a and the liquid crystal layer 34 to form a first alignment layer 33a; and the transparent magnetic thin film is sandwiched between the second substrate 31b and the liquid crystal layer 34 to form a second alignment layer 33b. Then the liquid crystal layer is surrounded by filling a spacer to assembly a liquid crystal (LC) cell. Thus, a liquid crystal alignment is formed by a magnetic field generated by the first and the second alignment layers 33a, 33b in the LC cell. Therein, the liquid crystal layer 34 has a liquid crystal material designed for use in a homeotropic or homogeneous alignment mode.

Thus, a novel method of alignments of liquid crystal employing magnetic thin films is obtained.

On using the present invention, the substrate 31 coated with the transparent conductive thin film 32 is cut to obtain a preferred size and is cleansed. Then the substrate 31 is put into the DC ion-beam sputter 2. A mechanical vacuum pump is used to lower a vacuum amount of the vacuum chamber 21 to 30 milli-Torr (mTorr). Then the working gas is filled into the vacuum chamber through the gas inflow pipe line 27 to obtain 65 mTorr for the vacuum amount of the vacuum chamber 21. A negative DC bias of 1120V is applied at the cathode 22 and the vacuum amount of the vacuum chamber 21 is maintained at around 70 mTorr. An ion beam current density of 255 $\mu A/cm^2$ is obtained for a film formation of the magnetic film on the substrate 31 at a coating rate of 212 angstroms per minute (Å/min). A magnetic thin film is then obtained on the substrate 31 through sputtering. Then, two substrates 31 after sputtering as described above, comprising the first substrate 31a and the second substrate 31b, are obtained, where the liquid crystal layer 34 is made of a material of a liquid crystal with a negative dielectric anisotropy (MLC-6608) or a positive dielectric anisotropy (K 15). Then, the LC cell 3 is assembled with the above structure using a spacer 35 having a thickness of 6 micro-meter ($\mu$m) to 23 $\mu$m.

Concerning the liquid crystal alignment, a homeotropic alignment for the liquid crystal layer 34 is obtained by the first and the second alignment layers 33a, 33b of the LC cell 3. Or, a homeotropic or homogeneous alignment for the liquid crystal layer 34 is further obtained with a pretilt angle greater than 1 degree (°) by rubbing treatment, where the pretilt angle prevents multi-domain alignments. To obtain a greater pretilt angle between 2° and 10° for shortening the response time of a liquid crystal device, conditions for depositing film and rubbing conditions are controlled. For example, a thin film is sputtered for 30 minutes and then is rubbed to obtain a pretilt angle greater than 4° for the homeotropic or homogeneous alignment.

Figure 4:
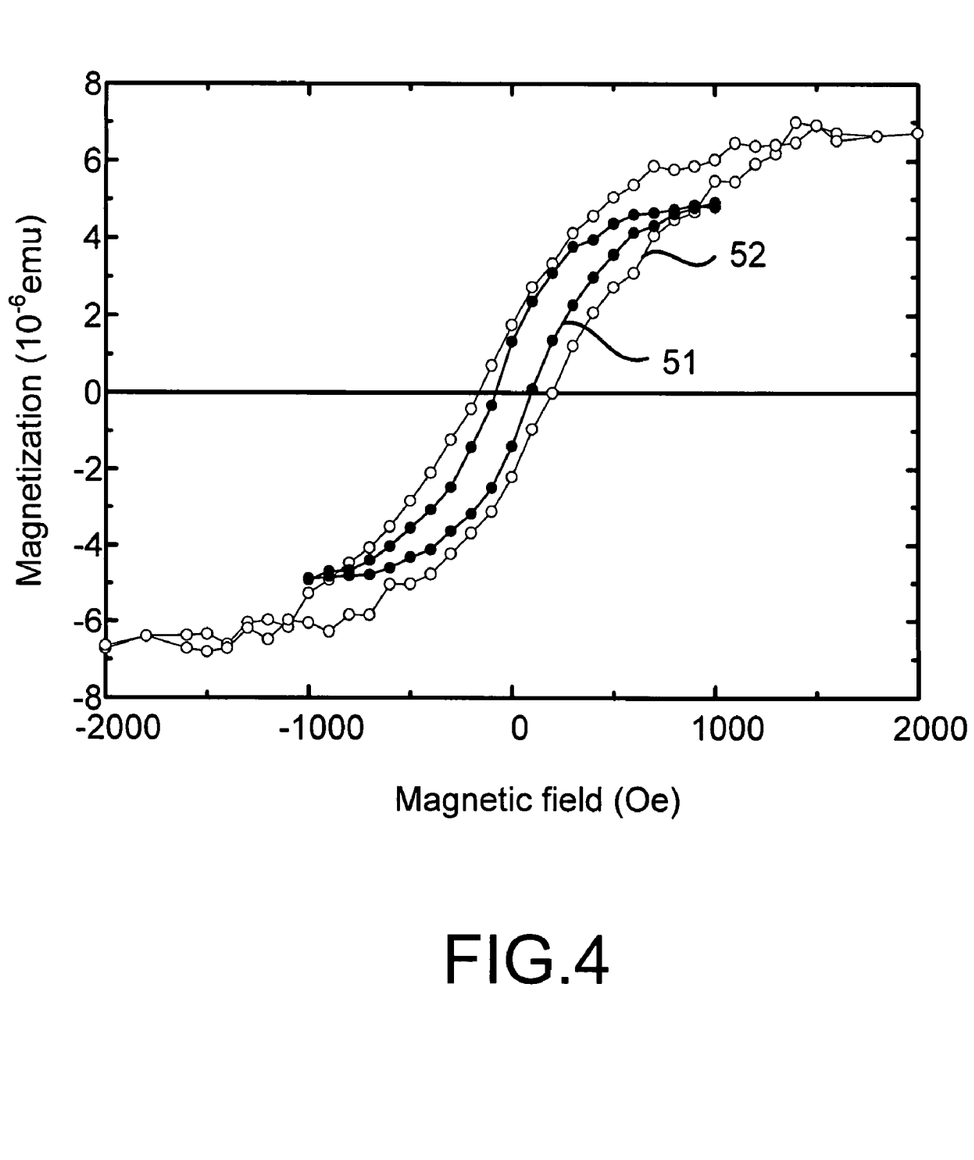
FIG. 4 is the view showing the hysteresis loops.
Figure 5:
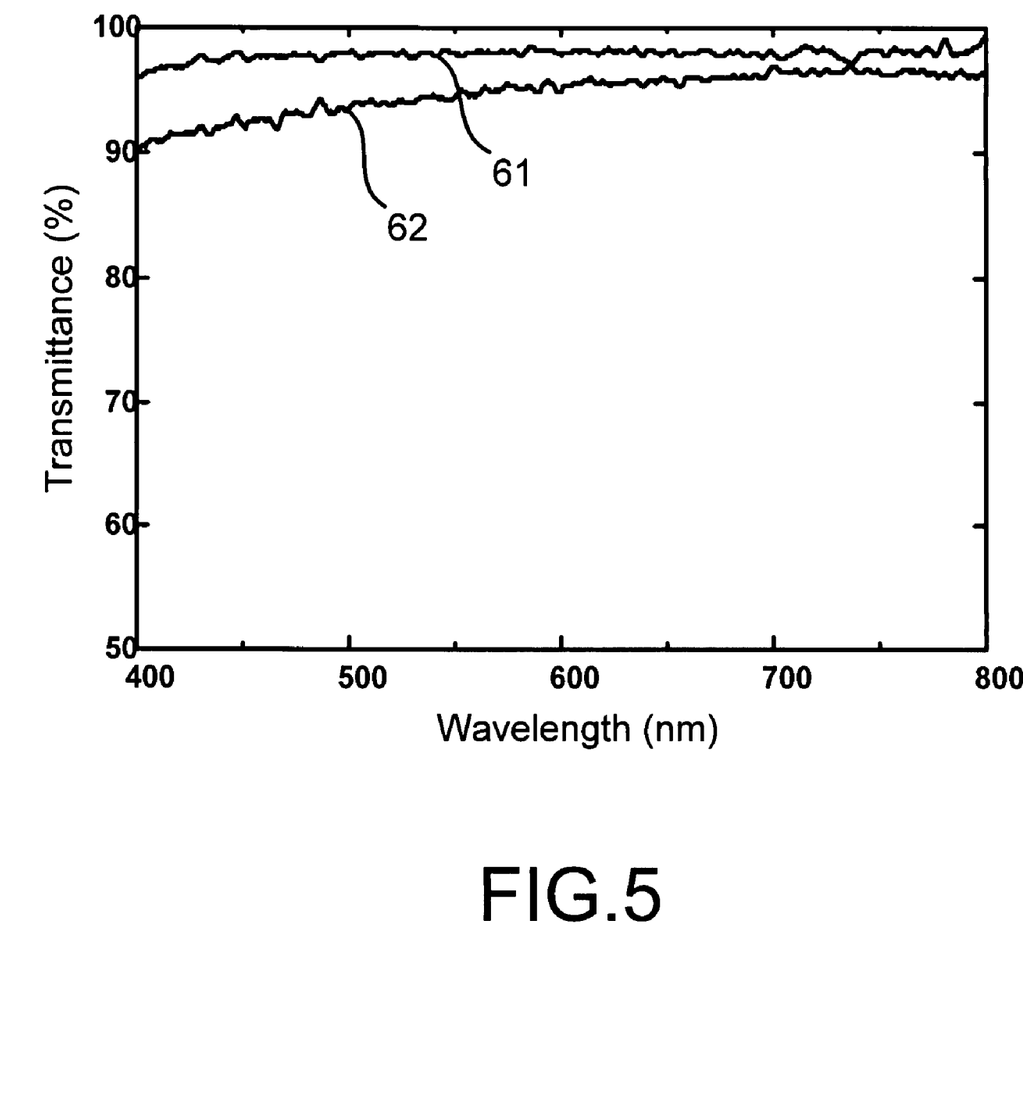
FIG. 5 is the view showing the curves of transmittance.

Please refer to FIG. 4 and FIG. 5, which are views showing hysteresis loops and curves of transmittance. As shown in the figures, a transparent magnetic thin film according to the present invention is made of an inorganic material having an iron oxide composition with ferrimagnetism or ferrimagnetism like $\gamma$-ferrtic oxide. Thus, aging by outside environment, like ultra violet, temperature, humidity, etc., is prevented. Through a material composition analysis and a measurement of magnetic properties of the transparent magnetic thin film, the transparent magnetic thin film after sputtering for 30 min has ferrimagnetism. A hysteresis loop 51 at a room temperature of 300 Kelvin (K) and a hysteresis loop 52 at a temperature of 10 K are shown in FIG. 4. Furthermore, the transparent magnetic thin film has a high transmittance at the visible band between 400 nanometer (nm) and 700 nm. The transparent magnetic thin film with a thickness of 63.6 nm has a good alignment effect up to 95% as shown in a curve of transmittance 61. And, the transparent magnetic thin film with a thickness of 212 nm still has an alignment effect up to 90% as shown in another curve of transmittance 62. It proves that the transparent magnetic thin film according to the present invent has a high transmittance at the visible band and thus is available to liquid crystal display. And, the characteristic of large hardness and non conductivity of the transparent magnetic thin film provide good isolation between a driving circuit of thin-film-transistor array and the liquid crystal layer.

Figure 6:
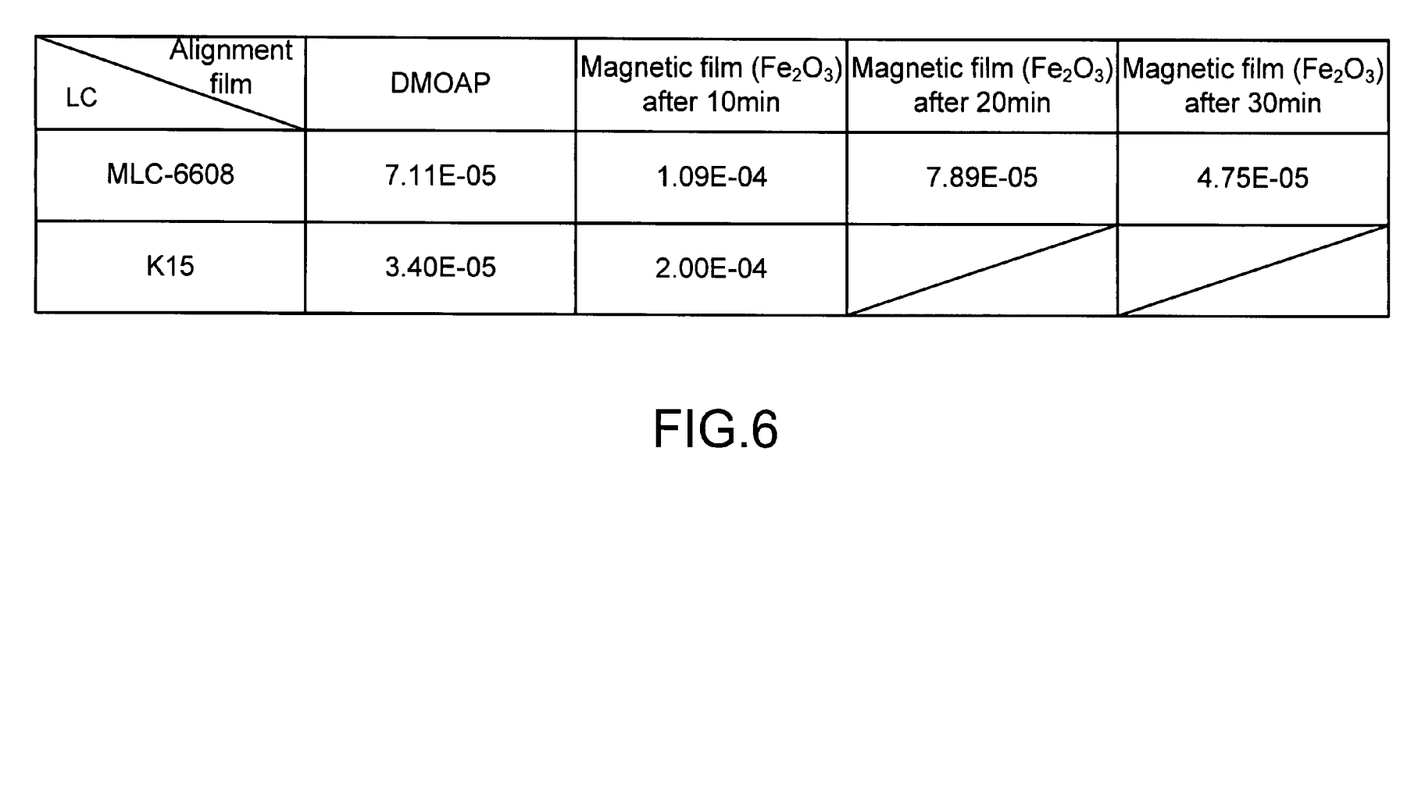
FIG. 6 is the view showing the comparison of the polar anchoring strengths.
Figure 7:
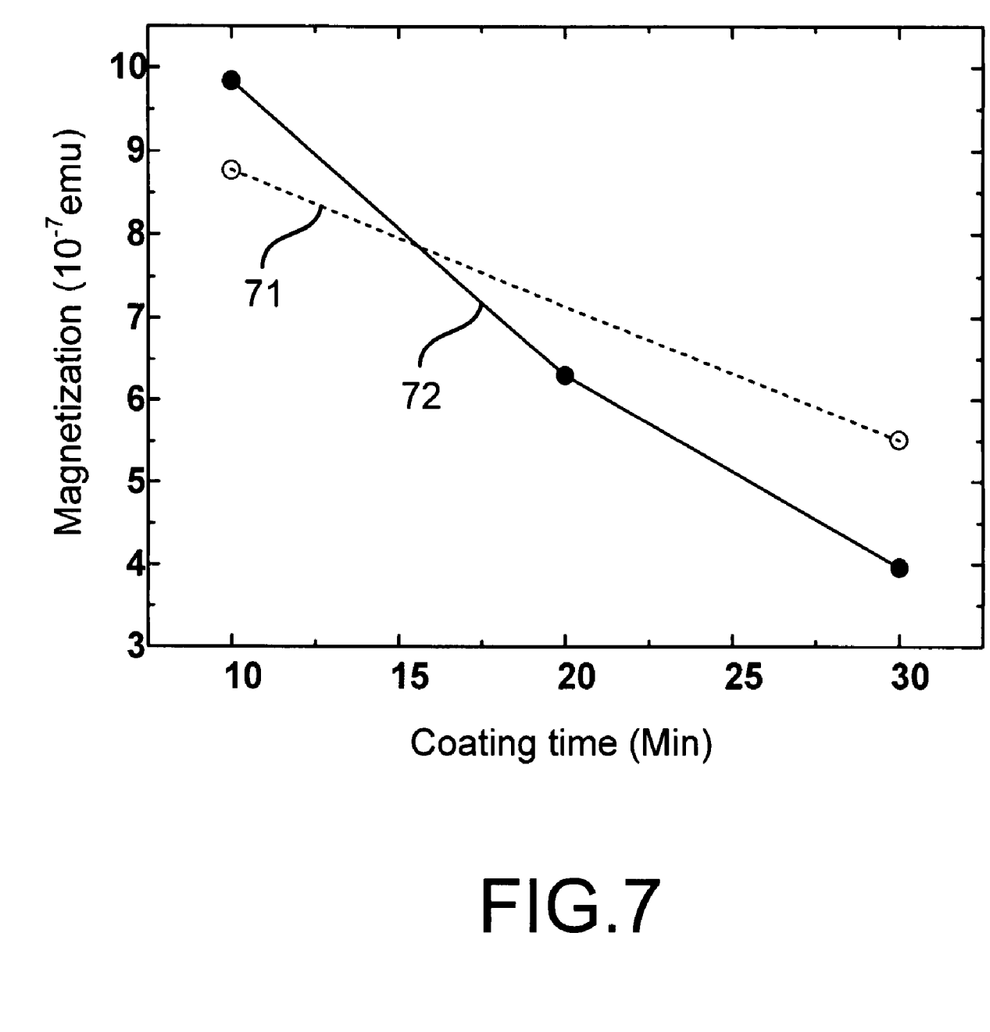
FIG. 7 is the view showing the relationship of the film thickness to the net magnetic moment.

Please refer to FIG. 6 and FIG. 7, which are a view showing a comparison of polar anchoring strengths and a view showing a relationship of film thickness to net magnetic moment. As shown in the figures, a measurement and a comparison, are made to alignment abilities of different transparent magnetic thin films with different film thicknesses and a DMOAP surfactant thin film. A measurement driven by an electric field and a measurement driven by a magnetic field are processed to measure the polar anchoring strengths of surface alignment layers. As is shown, transparent magnetic thin films obtained according to the present invention have polar anchoring strengths reaching that of a traditional DMOAP, even better.

Besides, through measuring magnetic properties, a thin film having a bigger film thickness, no matter normal to a film surface 71 or parallel to the film surface 72, is shown to have a small magnitude of net magnetic moment. Therein, a room temperature coercive field measured in the direction normal to the surface of transparent magnetic thin film is greater than 100 Oersted (Oe); and that measured in the direction parallel to the surface of transparent magnetic thin film is greater than 50 Oe. Thus, the surface anchoring strength of the alignment layer, which is the transparent magnetic thin film according to the present invention, is controllable by choosing a different magnetic strength of the thin film or a liquid crystal material having a different anisotropy of magnetic susceptibility ($\Delta_x$).

Hence, a transparent magnetic thin film made with a DC ion-beam sputter according to the present invention provides liquid crystal molecules a homeotropic alignment. For a further step, the transparent magnetic thin film is rubbed to provide a homeotropic or homogeneous alignment with a pretilt angle. Thus, the magnetic properties of transparent magnetic thin film are controllable by controlling conditions for film depositions, like an ion beam energy, an ion beam current density, a composition of working gas and a coating time; and, a magnitude of a pretilt angle and an alignment mode are changed by controlling rubbing conditions. Accordingly, the present invention is widely available with a simple procedure. The present invention is used in equipment with a DC or AC type plasma source while providing high transmittance, hardness and insulation. And, the transparent magnetic thin film obtained according to the present invention has potential uses in the applications of non-contact multi-domain alignment without extra procedure for alignment treatment, yet with a low cost.

To sum up, the present invention is a method of alignments of liquid crystal employing magnetic thin films, where a transparent magnetic thin film obtained through a DC ion-beam sputter has high transmittance, hardness and insulation; and magnetic properties of the thin film are changed through controlling conditions for depositing film and controlling rubbing conditions to further change a magnitude of a pretilt angle and an alignment mode of liquid crystal molecules; and a non-contact multi-domain alignment is obtained through a simple procedure with a low cost while no extra procedure is required for alignment treatment.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method of alignments of liquid crystal employing magnetic thin films, comprising steps of:
    (a) obtaining a substrate coated with a transparent conductive thin film, wherein said substrate is made of indium-tin oxide (ITO);
    (b) deposing said substrate into a sputter to be processed through a sputtering to be coated with a transparent magnetic thin film on said transparent conductive thin film with a working gas; and
    (c) obtaining two of said substrate sputtered with said transparent magnetic thin film, wherein said substrate comprises a first substrate and a second substrate; clipping a liquid crystal layer between said first substrate and said second substrate, wherein a first alignment layer is obtained by said transparent magnetic thin film of said first substrate between said first substrate and said liquid crystal layer and a second alignment layer is obtained by said transparent magnetic thin film of said second substrate between said second substrate and said liquid crystal layer; and surrounding said liquid crystal layer by filling a spacer to assemble a liquid crystal (LC) cell, wherein said LC cell has a liquid crystal alignment obtained through a magnetic field of said first alignment layer and said second alignment layer in said LC cell, wherein said transparent magnetic thin film is made of an inorganic material having an iron oxide composition with a characteristic selected from a group consisting of ferromagnetism and ferrimagnetism.

2. The method according to claim 1,
wherein said substrate is made of a material selected from a group consisting of a glass and an optical device.

3. The method according to claim 1,
wherein said sputter is a direct-current (DC) ion sputter, comprising a vacuum chamber; a cathode; an anode; a DC power supply; a cathode target being made of a stainless steel material; an exhaust pipe line; a gas inflow pipe line; and an anode circulating cooling system.

4. The method according to claim 3,
wherein said anode circulating cooling system comprises a cooling water inflow pipe line and a cooling water outflow pipe line.

5. The method according to claim 1,
wherein said sputter is an AC ion beam sputter.

6. The method according to claim 1,
wherein said working gas is a mixed gas, comprising argon, nitrogen and oxygen.

7. The method according to claim 1,
wherein said liquid crystal layer obtains an alignment through rubbing said transparent magnetic thin film;
wherein said alignment has a pretilt angle; and
wherein said alignment is selected from a group consisting of a homeotropic alignment and a homogeneous alignment.

8. The method according to claim 7,
wherein said liquid crystal layer has a liquid crystal material designed for use in an alignment mode; and
wherein said alignment mode is selected from a group consisting of a homeotropic alignment mode and a homogeneous alignment mode.

9. The method according to claim 3,
wherein said DC ion-beam sputter uses an adjustable high energy ion beam to sputter on said cathode target and thus said transparent magnetic thin film is obtained by reacting iron ions with oxygen on a surface of said anode.

10. The method according to claim 9,
wherein said transparent magnetic thin film is sputtered below a temperature of 250 Celsius degrees.

11. The method according to claim 1,
wherein said liquid crystal layer obtains a homeotropic alignment through said transparent magnetic thin film.

12. The method according to claim 11,
wherein said liquid crystal layer has a liquid crystal material designed for use in a homeotropic alignment mode.

13. The method according to claim 1,
wherein said inorganic material is γ-ferric oxide.

14. The method according to claim 1,
wherein said transparent magnetic thin film changes magnetic properties of said transparent magnetic thin film through controlling conditions for the film depositions.

15. The method according to claim 14,
wherein said conditions for film depositions comprises an ion beam energy, an ion beam current density, a composition of a working gas and a coating time.

16. The method according to claim 15,
wherein said coating time is 5 minutes (min) to 30 min.

17. The method according to claim 15,
wherein said ion beam energy is higher than 700 volts.

18. The method according to claim 15,
wherein said ion beam current density is higher than 255 micro-amperes per square centimeter.

* * * * *